(12) United States Patent
Piech et al.

(10) Patent No.: US 11,986,686 B2
(45) Date of Patent: May 21, 2024

(54) ADAPTABLE SUPPRESSION TANK LEVEL SENSOR

(71) Applicant: Carrier Corporation, Palm Beach Gardens, FL (US)

(72) Inventors: Marcin Piech, East Hampton, CT (US); Tadeusz Pawel Witczak, Farmington, CT (US); Beata I. Wawrzyniak, South Windsor, CT (US); Lukasz Majchrzak, Sierakow (PL); Dawid Milcarek, Poznan (PL); Cezary Jedryczka, Lniano (PL)

(73) Assignee: Carrier Corporation, Palm Beach Gardens, FL (US)

( * ) Notice: Subject to any disclaimer, the term of this patent is extended or adjusted under 35 U.S.C. 154(b) by 366 days.

(21) Appl. No.: 17/254,578

(22) PCT Filed: Sep. 20, 2019

(86) PCT No.: PCT/US2019/052043
§ 371 (c)(1),
(2) Date: Dec. 21, 2020

(87) PCT Pub. No.: WO2020/112218
PCT Pub. Date: Jun. 4, 2020

(65) Prior Publication Data
US 2021/0275846 A1 Sep. 9, 2021

Related U.S. Application Data

(60) Provisional application No. 62/773,286, filed on Nov. 30, 2018.

(51) Int. Cl.
*A62C 13/64* (2006.01)
*A62C 37/50* (2006.01)
(Continued)

(52) U.S. Cl.
CPC .............. *A62C 13/64* (2013.01); *A62C 37/50* (2013.01); *G01F 23/62* (2013.01); *G01F 23/74* (2013.01); *G01F 25/24* (2022.01)

(58) Field of Classification Search
CPC ......... A62C 13/64; A62C 37/50; A62C 13/62; G01F 23/62; G01F 23/74; G01F 25/24; G01F 23/72
(Continued)

(56) References Cited

U.S. PATENT DOCUMENTS 3,646,293 A   2/1972   Howard
3,678,750 A   7/1972   DiNoia et al.
(Continued)

FOREIGN PATENT DOCUMENTS

CN   102209979 A   10/2011
CN   202471189 U   10/2012
(Continued)

OTHER PUBLICATIONS

TLE4997 Programmable Linear Hall Sensor, Data Sheet v2.09, Jan. 2018, Infineon Technologies AG, Neubiberg, Germany.
(Continued)

*Primary Examiner* — Marrit Eyassu
(74) *Attorney, Agent, or Firm* — Bachman & LaPointe, P.C.

(57) ABSTRACT

A fire suppressant storage device (20) comprises: a tank (22) having a first port (40), a second port (70), and an interior (32) for storing fire suppressant. A discharge assembly (46) is mounted to the first port and comprises: a discharge valve (48); and a discharge conduit (50). The discharge conduit is at least partially within the interior and has an interior and an exterior. A liquid level measurement assembly is mounted to the second port and comprises: a tube (100) at least partially within the interior and having: an exterior and an
(Continued)

interior sealed relative to the surrounding tank interior. A float (120) surrounds the tube and has one or more magnets (130) and having a range of motion. A plurality of magnetic field sensors (152, 154) are along a carrier (150) within the tube interior. The carrier extends from a proximal end to a distal end. The plurality of magnetic field sensors (152, 154) comprise: a first plurality of one-dimensional sensors (152); and at least two three-dimensional sensors (154) distally of the first plurality.

20 Claims, 12 Drawing Sheets

(51) Int. Cl.
*G01F 23/62* (2006.01)
*G01F 23/74* (2006.01)
*G01F 25/20* (2022.01)

(58) Field of Classification Search
USPC .......................................................... 73/313
See application file for complete search history.

(56) References Cited

U.S. PATENT DOCUMENTS

| | | | |
|---|---|---|---|
| 4,056,979 A | 11/1977 | Bongort et al. | |
| 4,084,436 A | 4/1978 | Smitherman | |
| 4,165,935 A | 8/1979 | Bongort et al. | |
| 4,627,283 A | 12/1986 | Nishida et al. | |
| 4,730,491 A | 3/1988 | Lew | |
| 4,805,066 A | 2/1989 | Mergenthaler | |
| 4,955,231 A | 9/1990 | Mahoney | |
| 5,347,864 A | 9/1994 | Senghaas et al. | |
| 5,421,193 A | 6/1995 | Carlin et al. | |
| 5,829,303 A | 11/1998 | Fraser | |
| 5,874,899 A | 2/1999 | Barmore, Jr. et al. | |
| 6,253,611 B1 | 7/2001 | Varga et al. | |
| 6,430,380 B2 | 8/2002 | Kawakami | |
| 6,571,626 B1 | 6/2003 | Herford | |
| 6,923,057 B2 | 8/2005 | Sabatino | |
| 8,082,785 B2 | 12/2011 | Rudd | |
| 8,549,911 B2 | 10/2013 | Rudd et al. | |
| 9,134,162 B2 | 9/2015 | Taylor | |
| 2006/0117848 A1* | 6/2006 | Raffalt ................ | G01F 23/0038 73/313 |
| 2014/0090454 A1* | 4/2014 | Surman ................ | G01N 27/026 73/61.61 |
| 2017/0074714 A1* | 3/2017 | Aschenbrenner ....... | G01F 25/20 |
| 2017/0074715 A1* | 3/2017 | Bartos .................... | G01F 23/76 |
| 2019/0077293 A1* | 3/2019 | Morel-Fatio ......... | B67D 7/3218 |

FOREIGN PATENT DOCUMENTS

| | | |
|---|---|---|
| CN | 204671797 U | 9/2015 |
| CN | 106461449 A | 2/2017 |
| CN | 107430023 A | 12/2017 |
| DE | 102005031987 A1 | 1/2007 |
| WO | 2017209170 A1 | 12/2017 |

OTHER PUBLICATIONS

TLV493D-A1B6 3D Magnetic Sensor, Data Sheet rev. 1.0, Jan. 29, 2016, Infineon Technologies AG, Neubiberg, Germany.
International Search Report and Written Opinion dated Dec. 5, 2019 for PCT/US2019/052043.
Chinese Office Action dated Dec. 6, 2023 for Chinese Patent Application No. 201980041001.1.

\* cited by examiner

ADAPTABLE SUPPRESSION TANK LEVEL SENSOR

CROSS-REFERENCE TO RELATED APPLICATION

Benefit is claimed of U.S. Patent Application No. 62/773,286, filed Nov. 30, 2018, and entitled "Adaptable Suppression Tank Level Sensor", the disclosure of which is incorporated by reference herein in its entirety as if set forth at length.

BACKGROUND

The disclosure relates to fire suppression. More particularly, the disclosure relates to level sensing in systems using liquid agents.

Liquid fire suppression agents have been used for decades. Although some agents such as hydrofluorocarbon (HFC) (e.g. Halon 1301 (bromotrifluoromethane) and HFC-227ea (heptafluoropropane)) are in disfavor due to environmental concerns, replacements are readily commercially available, such as a fluoroketone formulated as dodecafluoro-2-methylpentan-3-one (1,1,1,2,2,4,5,5,5-nonafluoro-4-(trifluoromethyl)-3-pentanone) ($CF_3CF_2C(O)CF(CF_3)_2$) (ASHRAE nomenclature FK-5-1-12). Such agents are typically used with a pressurant/propellant such as nitrogen ($N_2$). Kidde-Fenwal, Inc. of Ashland, Massachusetts manufactures an exemplary fire suppression system, the Kidde® ADS™ Other suppressant agents and pressurants/propellants may be used in fire suppression systems as necessary to meet desired fire suppression capabilities.

Typically such agents are stored as a liquid in one or more metal tanks (e.g., steel tanks having a cylindrical centerbody and domed ends). A tank is typically positioned with its axis vertical so that one end is an upper end or top and the other a lower end or base. The upper end typically has a number of ports with fittings (e.g., threaded fittings). Typically a large center port receives a discharge assembly. The discharge assembly may include a fitting portion mated to the tank fitting and an external valve (e.g., automatically controllable via a control system). A discharge conduit (also known as a siphon tube or dip tube) extends downward into the tank and typically has an open lower end near the bottom of the tank. In facility configurations requiring multiple tanks, the tanks may be connected to a suppression system serially, independently, or in distributed locations in different configurations, and may be collocated or distributed throughout a facility.

Due to their low heat of evaporation and high vapor pressure (e.g., relative to water), typical liquid fire suppression agents will rapidly vaporize at discharge from the nozzle outlets and thus be delivered as vapor.

If the discharge valve is opened, pressure in the tank headspace (e.g., from the pressurant/propellant noted above) is sufficient to drive liquid suppressant up through the discharge conduit and out of the tank. Pre-use, the surface level of liquid in the tank will typically be well into the upper half of the tank. The exact position will depend on factors including the nature of the suppressant, the nature of the pressurant/propellant (e.g. composition and whether internally or externally located), and the application.

It is necessary to at least occasionally measure the fluid level in the tank (e.g., safety regulations typically require semi-annual inspection including verification of agent amount). To do this without venting the tank, several liquid level measurement systems have been proposed. A number of these systems make use of an additional vertically-extending conduit mounted to an additional port in the tank upper end. Typically, the tanks may be provided with multiple smaller off-center ports (e.g., with internally-threaded fittings) in addition to the center port. These ports may serve for various functions. An exemplary such liquid level sensing system has a fitting mounted to one of those additional port fittings with a conduit (e.g., metal tube) extending vertically down toward the base of the tank. Unlike the discharge conduit, the lower end of the liquid level sensing tube is closed so that the interior of the liquid level sensing tube is sealed relative to the surrounding interior of the tank. A float may surround the liquid level sensing tube. The float may be magnetized. The float may magnetically interact with a member movable within the tube to in turn provide indication of the liquid level.

In one basic example of such a liquid level sensing system, the liquid level sensing fitting, in turn, has a removable cap or plug providing access to the upper end of the tube. A magnetic weight at the end of a measuring tape, string, or other device, may be located in the tube. The magnetic weight will interact with the float to be held at the same level as the float and thus at the level of the surface of liquid in the tank. This allows the level of the surface of liquid in the tank to be measured relative to the liquid level sensing fitting and thus relative to any other reference on the tank. Such measurements are typically taken periodically manually by a person assigned to the task. In one example where the weight and measuring tape are already in the tube, the end of the tape opposite the weight may be connected to the removable cap or plug. The user may open the cap or plug and pull to take up slack in the measuring tape. The user may take a reading with the tape to determine the liquid level of the tank.

Yet more complex systems are automated with the member permanently within the tube and its vertical position electronically measured. Yet other systems involve capacitive measurements between inner and outer tubes.

SUMMARY

One aspect of the disclosure involves a fire suppressant storage device comprising: a tank having a first port, a second port, and an interior for storing fire suppressant. A discharge assembly is mounted to the first port and comprises: a discharge valve; and a discharge conduit at least partially within the interior. The discharge conduit has: an interior; and an exterior. A liquid level measurement assembly is mounted to the second port and has a tube at least partially within the interior. The tube has an exterior and an interior sealed relative to the surrounding tank interior. A float surrounds the tube and has one or more magnets and has a range of motion. A plurality of magnetic field sensors are along a carrier within the tube interior. The carrier extends from a proximal end to a distal end. Wherein the plurality of magnetic field sensors comprise: a first plurality of one-dimensional sensors; and at least two three-dimensional sensors distally of the first plurality.

In one or more embodiments of any of the foregoing embodiments, said first plurality of one-dimensional sensors are analog interface sensors and said at least two three-dimensional sensors are digital interface sensors.

In one or more embodiments of any of the foregoing embodiments, said at least two three-dimensional sensor are lowermost sensors.

In one or more embodiments of any of the foregoing embodiments, said first plurality of one-dimensional sensors are at a first longitudinal spacing ($S_1$); and said at least two three-dimensional sensors are at a second longitudinal spacing ($S_2$) shorter than the first longitudinal spacing.

In one or more embodiments of any of the foregoing embodiments, said at least two three-dimensional sensors are only two three-dimensional sensors sensors.

In one or more embodiments of any of the foregoing embodiments, the fire suppressant storage device further comprises said fire suppressant within the tank interior, the discharge conduit at least partially immersed in the fire suppressant.

In one or more embodiments of any of the foregoing embodiments, said fire suppressant comprises a clean agent.

In one or more embodiments of any of the foregoing embodiments, the fire suppressant storage device further comprises a compressed gas propellant in a headspace of the tank.

In one or more embodiments of any of the foregoing embodiments, the fire suppressant storage device further comprises an electronics module coupled to the plurality of magnetic field sensors and programmed for characterizing a float magnet configuration.

Another aspect of the disclosure involves a method for remanufacturing a fire suppressant storage device from a first configuration to a second configuration. The fire suppressant storage device has in the first condition: a tank having a first port, a second port, and an interior for storing fire suppressant. A discharge assembly is mounted to the first port and comprises: a discharge valve; and a discharge conduit at least partially within the interior and having an interior and an exterior. A liquid level measurement assembly is mounted to the second port and comprises: a tube at least partially within the interior and having: an exterior and an interior sealed relative to the surrounding tank interior. A float surrounds the tube. A magnetic member is axially moveable within the tube interior. The method comprises: removing the magnetic member; inserting into the tube a carrier bearing a plurality of magnetic field sensors, the carrier extending from a proximal end to a distal end and electronically coupling the plurality of magnetic field sensors to an electronics module, during the inserting one or more of the magnetic field sensors passing through the float; and using said passing to calibrate the electronics module.

In one or more embodiments of any of the foregoing embodiments, the magnetic member is a permanent magnet or a ferromagnetic steel and the removing comprises removing a measuring tape with the magnetic member.

In one or more embodiments of any of the foregoing embodiments, the carrier comprising a printed circuit board.

In one or more embodiments of any of the foregoing embodiments, the tank has a fitting, the carrier comprises a cap or a plug, and the inserting comprises mating the cap or plug to the fitting.

In one or more embodiments of any of the foregoing embodiments, the method is performed while leaving suppressant in the tank.

In one or more embodiments of any of the foregoing embodiments, the using said passing to calibrate the electronics module comprises: using the magnetic field sensors to characterize the float; and, based on the characterization of the float, selecting a predefined sensing algorithm from a stored plurality of predefined sensing algorithms.

In one or more embodiments of any of the foregoing embodiments, the plurality of magnetic field sensors comprise: a first plurality of one-dimensional sensors; and at least two three-dimensional sensors distally of the first plurality; the using the magnetic field sensors to characterize the float comprises using the at least two three-dimensional sensors. The predefined sensing algorithm is an algorithm for use of the first plurality of one-dimensional sensors.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
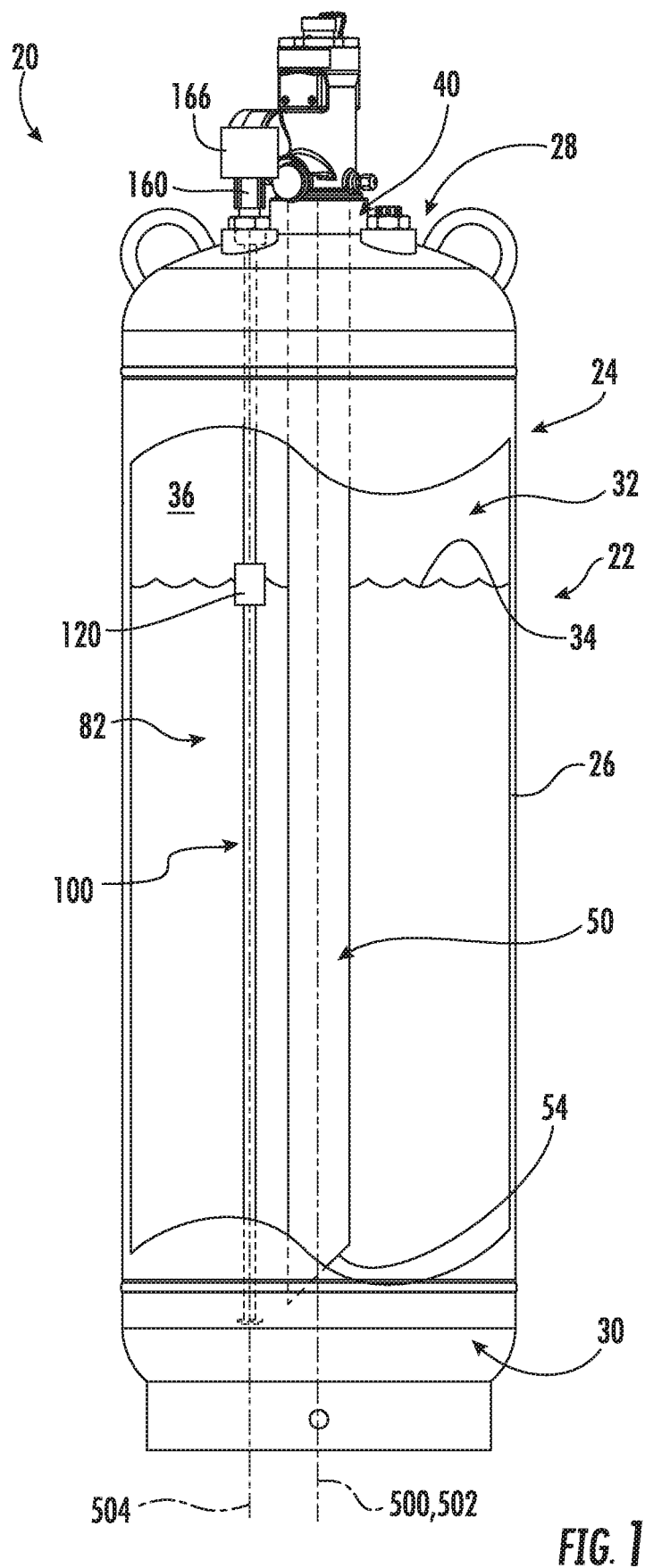
FIG. 1 is a partially cutaway view of a fire suppressant storage device.

FIG. 1 shows a fire suppression storage device 20 including a tank 22. The exemplary tank 22 has a body 24 including a cylindrical centerbody section 26 defining a central longitudinal axis 500. In an exemplary installation situation, the axis 500 is vertical. The tank 22 has respective upper and lower domed end portions 28 and 30. Exemplary tank materials are metal (e.g., steel or aluminum alloy) and the tank may represent any of numerous existing or yet-developed tank configurations. The tank has an interior 32 which, in pre-discharge condition, contains a body of liquid suppressant (agent) shown having a surface 34 leaving a headspace 36 thereabove to contain compressed gas pressurant/propellant. The upper end portion 28 bears a center port surrounded by a fitting 40 (e.g., internally-threaded or externally-threaded).

Exemplary suppressants are HFCs or non HFC agents such as FK-5-1-12 mentioned above. Suppressants may broadly include "clean agents" and aqueous agents. A "clean agent" is defined as an "electrically nonconductive, volatile, or gaseous fire extinguishant that does not leave a residue upon evaporation." National Fire Protection Association (NFPA) Standard for Clean Agent Fire Extinguishing Systems—NFPA 2001.

Further "clean agents" include halocarbons (haloalkanes, haloketones, haloacids and the like) and their blends. Specific examples include fuoroform (HFC-23), bromotrifluoromethane (Freon 13B1), trifluoroiodomethane (Freon 13T1), pentafluoroethane (HFC-125), 1,1,1,2,3,3,3-heptafluoropropane (HFC-227ea), and the like. Exemplary pressurant/propellant is $N_2$, argon (Ar), carbon dioxide (CO2), or blends.

Figure 2:
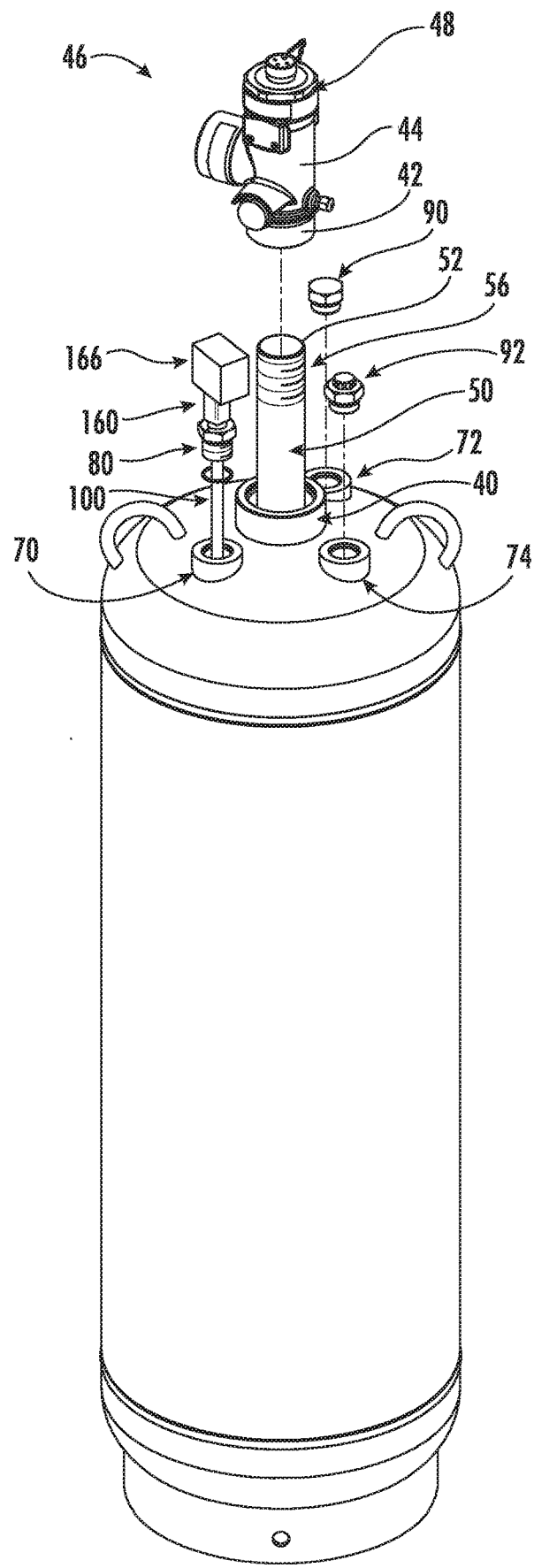
FIG. 2 is a partially exploded view of the device of FIG. 1

As shown in FIG. 2, the exemplary internally threaded fitting 40 receives a lower externally threaded portion 42 (FIG. 2) of a body 44 of a discharge valve assembly 46 having a discharge valve 48. The discharge valve assembly 46 combines with a discharge conduit (e.g., a metal tube) 50 to form a discharge assembly. The exemplary discharge conduit 50 extends from an upper end 52 (FIG. 2) to a lower end 54 (FIG. 1). An exemplary portion 56 adjacent the upper end 52 is externally threaded and received in an internally threaded bore of the discharge valve body lower portion 42. In operation, the lower end 54 is well below the liquid surface 34 (FIG. 1) so that pressure in the headspace 36 (FIG. 1) will drive suppressant upward through the discharge tube if the discharge valve is open. In the exemplary installed condition, the discharge conduit axis 502 is coincident with the tank axis 500.

As so far described, the fire suppressant storage device is representative of one exemplary configuration of many existing or yet-developed configurations to which the following teachings may apply.

FIG. 2 shows three off-axis ports 70, 72, and 74. All are internally-threaded. In an exemplary implementation of a retrofit from a baseline system, a top access plug 80 (FIG. 3) of the baseline liquid level sensing tube assembly is mounted to the port 70.

FIG. 2 also shows respective plugs 90 and 92 with the ports 72 and 74. These might respectively be re-fill ports, overpressure devices such as rupture disks or relief valves, auxiliary pressure gauges and the like. In alternative situations where an external pressurant/propellant is used (e.g., an external $N_2$ "driver" tank), one of the ports may couple to the driver tank or the driver tank may couple to the valve assembly.

As is discussed below, an exemplary implementation is discussed in the context of a retrofit of a suppression system suppressant tank already containing suppressant and already having a liquid level measuring tube and associated magnetic float. To detect float position, the retrofit may add an array of magnetic sensors (discussed below) inserted within the existing tube 100 (FIG. 3).

Figure 3:
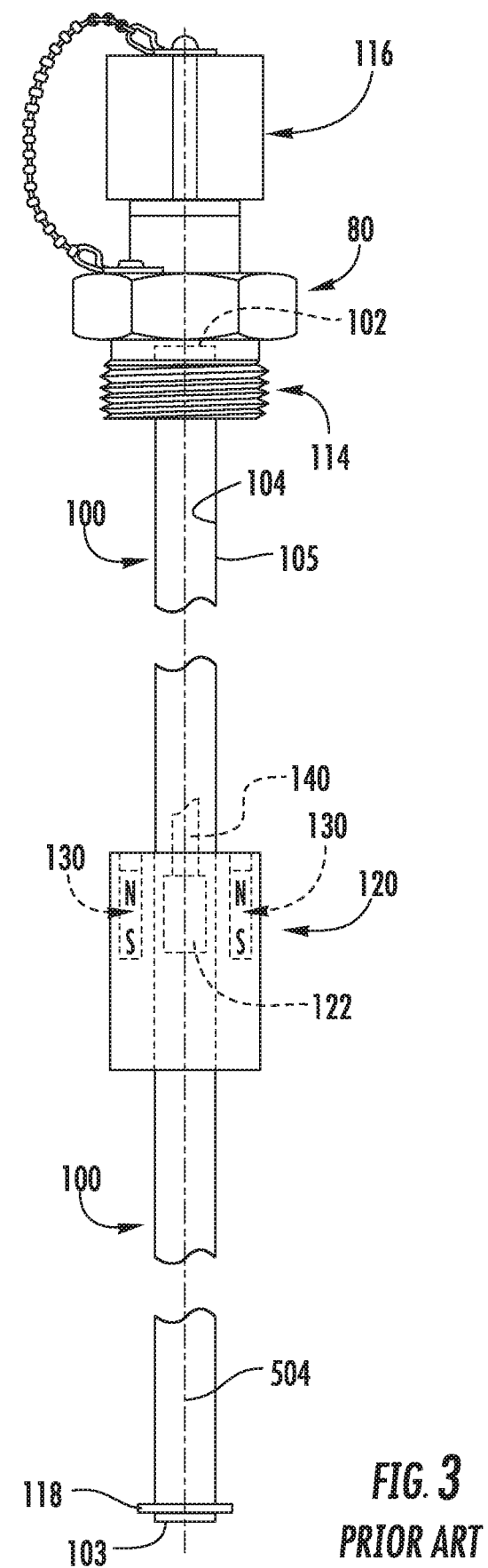
FIG. 3 is a broken side view of a baseline liquid level measurement assembly in a closed condition.

FIG. 3 shows the baseline liquid level measurement assembly as including the tube 100 depending from a lower end of the access plug 80. The exemplary access plug body and tube 100 are metallic (e.g., stainless steel). The exemplary tube 100 extends along a central longitudinal axis 504 shared with the plug 80 and the port 70 (FIG. 1 when assembled/installed). The tube 100 extends from an open upper end 102 to a closed lower end 103 and has an inner diameter (ID) surface 104 and an outer diameter (OD) surface 105.

Figure 4:
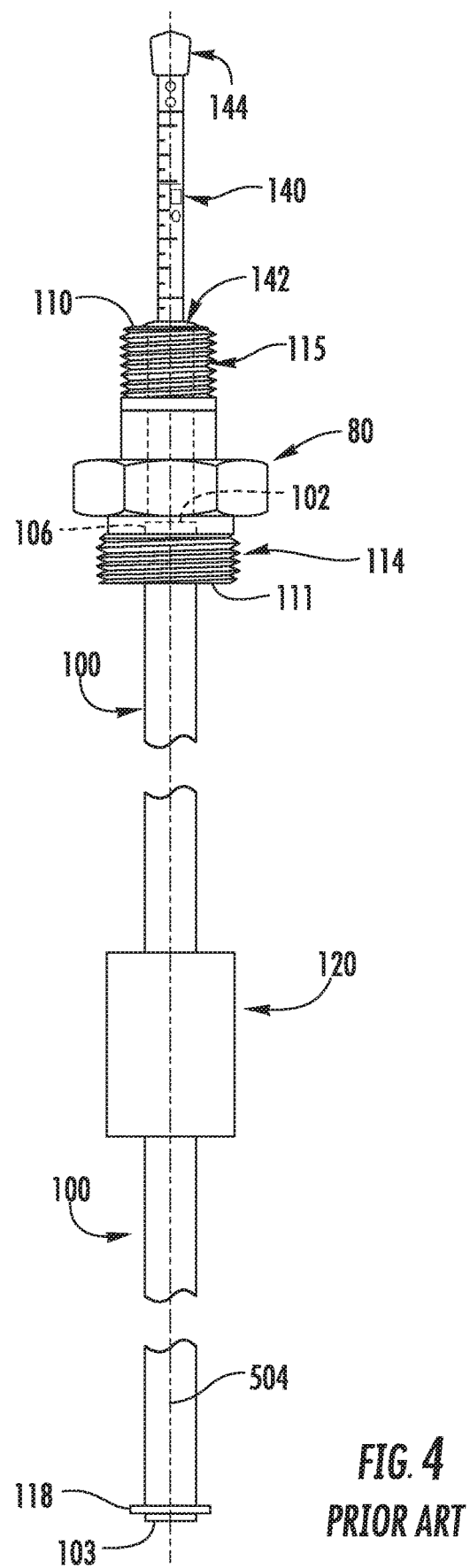
FIG. 4 is a partial side view of the baseline liquid level measurement assembly during measurement.

The exemplary plug 80 has an upper end 110 (FIG. 4) and a lower end 111. The exemplary tube 100 is mounted to the plug 80 via an upper portion 106 welded or brazed in a lower portion of an axial passageway through the plug 80. The lower portion 114 of the plug 80 has an externally threaded outer diameter (OD) surface threaded to the internal thread of the port 70. The exemplary plug 80 has an upper externally threaded portion 115 received in a protective cap 116 (FIG. 3; e.g., a plastic tethered cap).

The tube lower end 103 (FIG. 3) is closed (e.g., plugged or capped) to isolate the interior of the tube from the liquid agent. The tube is surrounded by a float 120 (FIG. 3) that moves up and down with the liquid agent surface 34 (FIG. 1). A center member 122 (FIG. 3) is within the tube interior and magnetically coupled to the float 120 to move therewith even though the tube interior contains only gas or is under vacuum. The exemplary tube 100 has a stop 118 limiting the downward movement of the float. An exemplary stop is a metallic clip in a groove (not shown) in the tube OD surface 105. An alternative might be the rim of a cap (not shown) threaded to the lower end of the tube.

The exemplary baseline system is of the type having a simple magnetic center member 122 (e.g., permanent magnet or ferromagnetic steel) within the tube at one end of a tape measure 140 (FIG. 3).

As is discussed further below, the exemplary float 120 has one or more magnets 130 (FIG. 3). The magnet(s) may form a continuous or segmented annulus or a circumferential array. FIG. 3 thus represents both a central longitudinal sectional view through a float having an annular magnet and a central longitudinal view through a float having a circumferential array of magnets (with the cut plane intersecting diametrically opposed magnets such as cylindrical magnets).

The retrofit is performed in situ without removing suppressant and without breaking the sealed nature of the tank interior. In the example, the protective cap 116 (FIG. 3) is first removed by a user (e.g., a technician) from the plug 80 atop the baseline liquid level measuring assembly as if one were going to conduct a measurement. The technician may then actually conduct a measurement using the baseline assembly by taking up the slack in the tape measure 140 (FIG. 4) and taking a measurement. This measurement may be used in calibrating the retrofit.

The technician may then remove the tape measure 140 and its attached magnetic member 122 and discard. For example, the exemplary baseline system has a slotted plastic plug 142 (FIG. 4) in the top of the plug 80. The tape measure passes freely through the slot but a stop 144 (e.g., molded plastic) at the upper end of the tape measure does not. The technician may simply pry the plastic plug 142 out of the plug 80. At this point, the tube 100 is open at its top to the external building environment. The float 120 around the tube is at the surface level of the suppressant.

Figure 5:
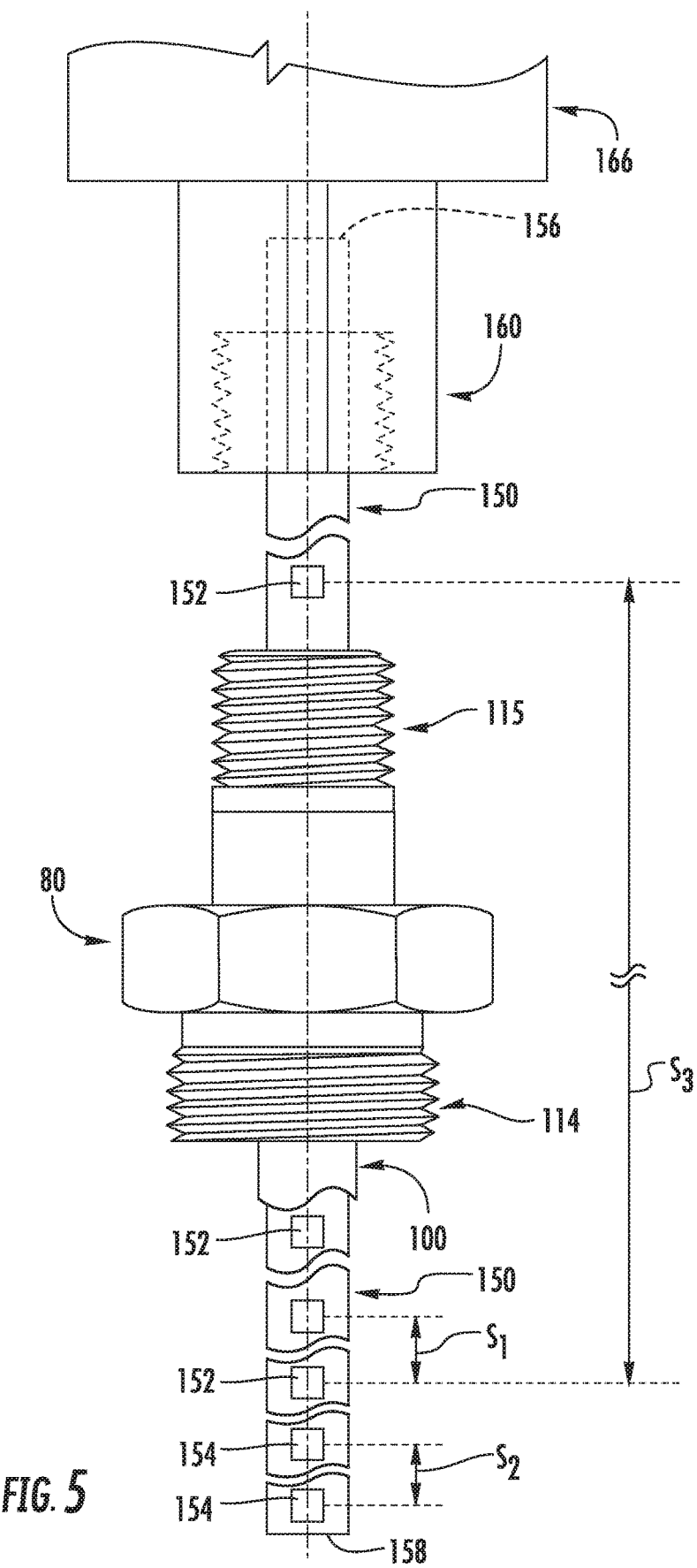
FIG. 5 is a partial side cutaway view of a replacement liquid level measurement assembly during installation.

For the retrofit, the technician installs into the tube a carrier 150 (FIG. 5) bearing a plurality of magnetic sensors 152, 154. An exemplary carrier 150 is a printed circuit board. The carrier 150 extends from an upper or proximal end 156 to a lower or distal end 158. An upper or proximal end portion is mounted to a mounting member 160. One example of a mounting member 160 is a plastic plug (not shown) that would replace the slotted plastic plug 142. An alternative is a plastic or metal cap (e.g., internally-threaded) that replaces the FIG. 3 protective cap 116.

The exemplary mounting member 160 has upper electrical contacts (e.g., in a connector such as a socket or plug—not shown) for mating with an electronics module 166. Alternative configurations may have a connector connected via wires to a more remote electronics module (not shown—e.g., mounted to the discharge valve body).

Figure 6:
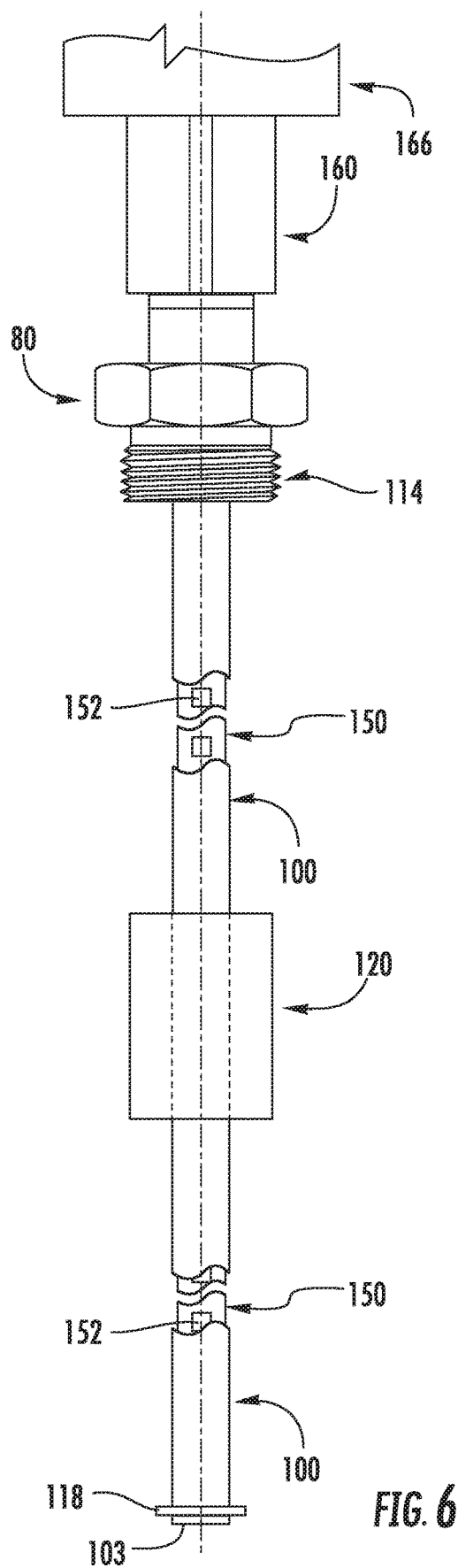
FIG. 6 is a broken partial side view of the replacement liquid level measurement assembly in an installed condition.

In the exemplary retrofit, the electronics module 166 is pre-assembled to the mounting member 160 and is running in a setup or calibration mode. The technician inserts the PCB 150 down into the tube until it reaches a fully-inserted condition (FIG. 6). The insertion causes at least some of the sensors 152, 154 to pass downward through the height of the magnet(s) of the float. During this process, the electronics module 166 is actively receiving input from the sensors. This provides information regarding how the sensors respond to the influence of the magnet(s) 130. Not all sensors need pass by the magnet(s) 130. For example, if the PCB has an evenly spaced array of identical sensors, only two sensors need pass fully through the relevant range of influence of the magnet(s) to calibrate the other sensors.

An exemplary module 166 may include one or more: processors; memory (e.g., for storing program information for execution by the processor to perform the operational methods and for storing data used or generated by the program(s)); hardware interface devices (e.g., ports) for interfacing with the PCB; user input devices (e.g., pushbutton or other switches and/or a touchscreen; user output devices (e.g., lights such as LEDs, speakers for audible output, displays (e.g., said touchscreen); electronic communication devices (Ethernet ports for wired communication or radios for RF communication such as WiFi, Bluetooth, cellular and the like).

Particular examples of such an in situ calibration render the retrofit effective for use with baseline systems having a variety of different float and magnet configurations.

In the case of non-annular float magnets, the relative orientation of the float to the inserted PCB will influence the effect of the magnets on the sensors. For example, a float having diametrically opposite magnets would have a different effect if the magnets faced normal to the PCB versus facing parallel. Similarly, if the float had only a single magnet at a single circumferential location, the particular circumferential location would affect the performance (response of the sensors).

Such non-uniformity or asymmetry is optionally addressed via the use of three-dimensional (3D) sensors. For example, the illustrated configuration shows two 3D sensors 154 low on the PCB and a plurality of one-dimensional (1D) sensors 152 thereabove. In a discussed example, the 1D sensors are used for ultimately measuring liquid level; the 3D sensors are used for confirming magnetic field symmetry and calibration. The combination of 3D and 1D sensors is desirable because 1D sensors offer an advantageous combination of a higher resolution and lower cost than the 3D sensors. Meanwhile, the 3D sensors facilitate recognition of the float magnet configuration (e.g., symmetric or asymmetric magnetic field distribution at the sensor location) and serve to calibrate the sensor response in situ.

The calibration comprises characterizing the float (e.g., identifying the nature of the float such as magnet distribution, magnetic field strength and magnetic field distribution). Based on the characterization obtained by the 3D sensors 154, the control module selects an algorithm from a plurality of predetermined algorithms (e.g., corresponding to specific known floats (e.g. for known models of existing float) or specific known float configurations) and populates any open fields in such algorithms (e.g., particular constants in an equation used in the algorithm).

The exemplary 1D sensors 152 are at a single longitudinal/vertical on-center spacing $S_1$. The exemplary 3D sensors 154 are at a smaller on-center spacing $S_2$. Exemplary $S_1$ is 40.0-50.0 mm, more broadly 20-60 mm. Exemplary $S_2$ is 10.0-30.0 mm, more broadly 8.0-35.0 mm. Exemplary $S_1/S_2$ is at least 2.0, more particularly 2.0-5.0. The smaller relative spacing may be due to the lower sensitivity typical of 3D sensors relative to 1D sensors.

Exemplary 1D sensors 152 are single-axis Hall effect sensors. Exemplary analog interface programmable three-pin sensors are available as part. no. TLE4997 from Infineon Technologies AG, Munich, Germany. Exemplary 3D sensors are three-axis Hall effect sensors. Exemplary digital interface six-pin sensors are available as part. no. TLV493D-A1B6 from Infineon Technologies AG, Munich, Germany.

An exemplary total on-center span $S_3$ of the array of 1D sensors 152 is 600 mm to 1 m. In most cases the span $S_3$ is dictated by the length of the tube 100, which can range from 10 mm to 2000 mm, more typically 250 mm to 2000 mm. Typically, the span $S_3$ will be at least 25% of a height of the tank interior (e.g., 15% to 100% or 25% to 95% or 40% to 95%).

During the installation, with the insertion of the PCB, at least the two 3D sensors 154 will pass through the relevant range of influence of the magnet(s) 130. From the 3D sensors, the particular nature of the float magnets is determined both in terms of the circumferential asymmetry or unevenness (if any) and the axial variation relative to the float.

Figure 7:
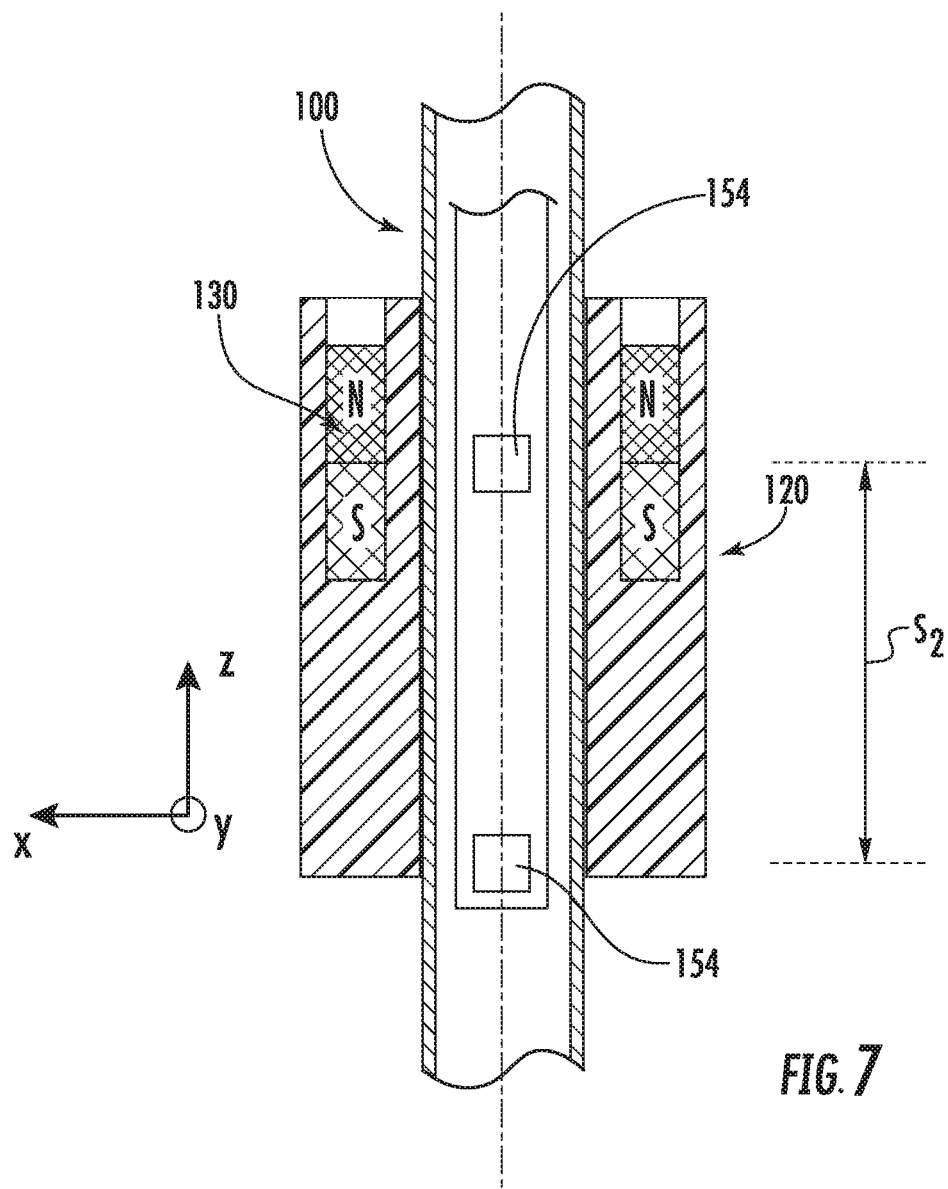
FIG. 7 is a partial central vertical cutaway view of a lower portion of the replacement liquid level measurement assembly during an initialization condition.
Figure 8:
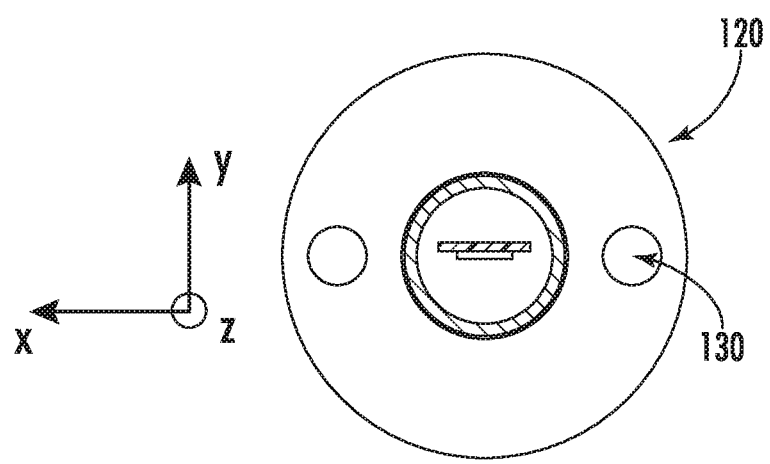
FIG. 8 is a transverse sectional view of the replacement liquid level measurement assembly of FIG. 7.
Figure 9:
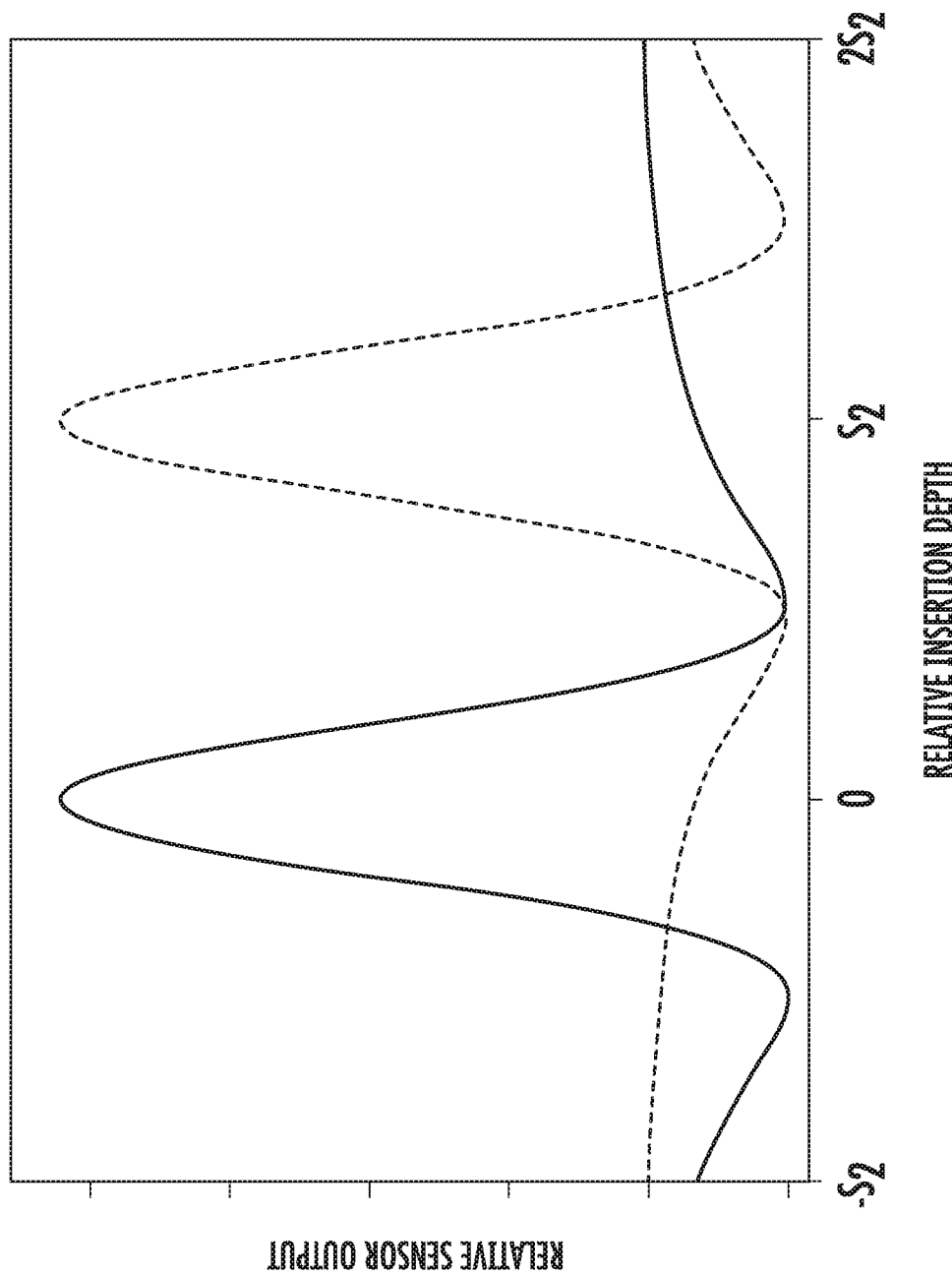
FIG. 9 is a plot of sensor output vs. position for a pair of calibration sensors in the replacement liquid level measurement assembly.

In one particular example, the float 120 (FIGS. 7 and 8) contains two diametrically opposite magnets 130. The magnet polarity is parallel to the length of the PCB, while the diameter between magnet centers is parallel to the face of the PCB to which the sensors 152, 154 are mounted. The PCB 150 carries the two 3D sensors 154 at an on-center spacing $S_2$ of an exemplary 30 mm (FIG. 7). When the PCB is inserted into the tube 100, the 3D sensors read the float's magnetic field in z-axis (along the PCB length). For example, FIG. 9 shows a zero depth arbitrarily defined as when the lower sensor (solid line plot) is aligned with the magnets. Thus, with this reference, FIG. 7 illustrates $S_2$ insertion when the upper sensor (broken line plot) aligns with the magnets. At the relative depth of zero (in this particular example), the lower 3D sensor reads the maximum (positive) field from the float, while the upper 3D sensor just begins to notice it. At the relative depth of $S_2/2$, both 3D sensors read the minimum (negative) field. By the relative insertion of $S_2$ (FIG. 7 schematic), the upper 3D sensor reads the maximum field from the float magnets, while the lower 3D sensor barely registers it.

Figure 10:
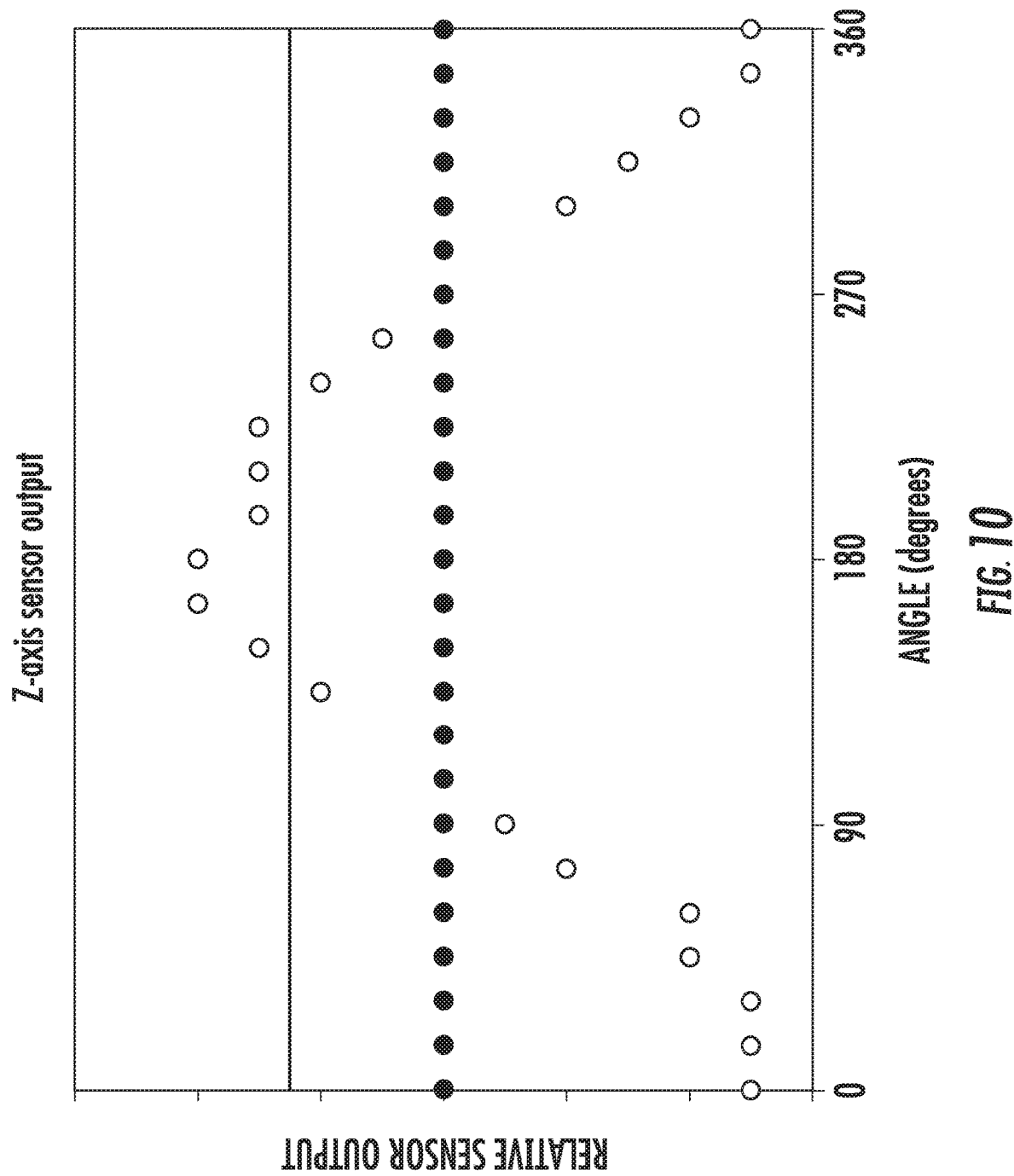
FIG. 10 is a plot of sensor output vs. rotation angle for one of the calibration sensors in the replacement liquid level measurement assembly.

With this magnet configuration (i.e., two diametrically opposite magnets with the magnet polarity parallel to the length of the PCB), rotation of the float about the z-axis does not affect the z-axis sensor reading (solid dots in FIG. 10). However, the x-axis and the y-axis responses vary as function of the rotation angle (e.g., the solid dots in FIG. 11 correspond to y-sensor response).

Figure 11:
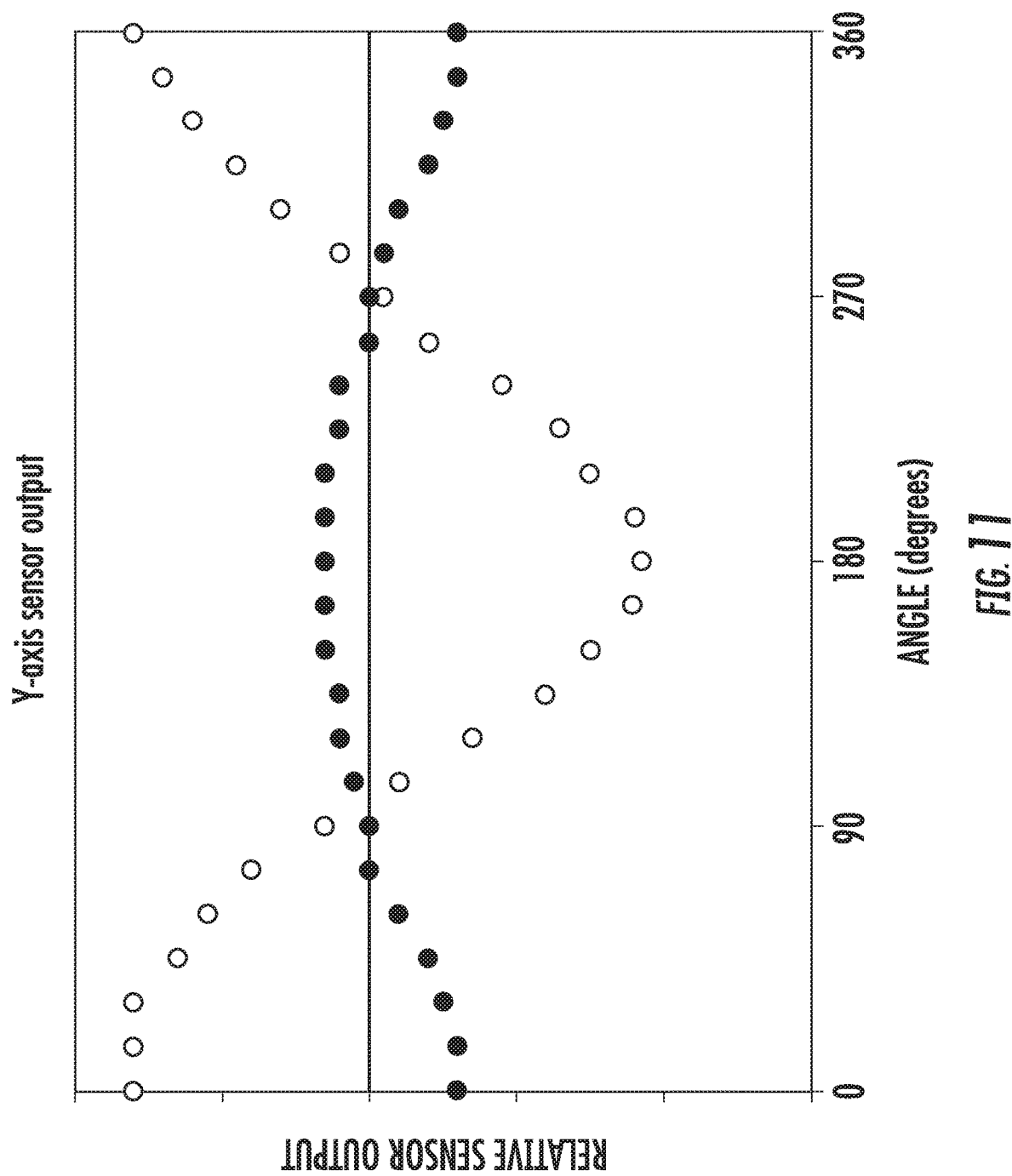
FIG. 11 is a plot of relative sensor output vs. insertion depth for one of the calibration sensors in the replacement liquid level measurement assembly.

In contrast, for a float containing a single full annulus ring magnet, the responses along all three axes, the x-, y-, and z-axes are constant (solid lines in FIG. 10 and FIG. 11).

Meanwhile, when the float contains a single magnet with polarity parallel to the PCB (e.g., if only one of the two magnets 130 was present), the z- and y-axis sensor responses present a different symmetry with respect to the angular rotation (empty circles in FIG. 10 and FIG. 11). Based on measurements from the single 3D sensor, the symmetry of the magnetic field distribution produced by float magnets is thus discerned.

Thus, discussed below, a three-step process involves: characterizing the float (e.g., magnet configuration); selecting the appropriate sensor array; and calibrating that sensor array.

An exemplary method for determining the float magnet configuration comprises the following sub-steps/acts.

As a first sub-step, the technician seeks to vertically register or align the PCB 150 with the float 120. The technician may connect the PCB 150 to the electronics module 166 with the PCB outside of the tube 100 and command the module 166 to enter the alignment mode (e.g. via a user interface (such as buttons), or the module may automatically enter this mode). In this mode or stage, the electronics module 166 reads the 3D sensor 154 outputs with high frequency (high is relative to the likely speed of insertion so that the cycles correspond to fine movements relative to the sensor spacing e.g., 1-30 Hz and preferably 5-10 Hz). The technician inserts the sensor PCB into the tube 100 until the lower 3D sensor 154 registers with the magnets. Registry occurs when the lower sensor 154 detects the maximum magnetic field. This maximum is determined by the electronics module 166 comparing the successive sensor readings.

Referring to FIG. 9, solid line, the sensor 154 (lower of the two sensors 154 in this example) first outputs negative field values and then increasing positive values until the maximum at 0 relative insertion depth. Past the maximum, the sensor then outputs again decreasing positive values. The electronics module compares each new sensor output to the proceeding one. When a threshold (e.g., five) such successive sensor readings indicate a trend of decreasing sensor output (this number could be different based on the sampling frequency of the detected output values; for example it could be 3-90 when using output acquisition frequency between 1-30 Hz, respectively), the electronics module communicates to the technician that the maximum has been reached. Exemplary communication is by light output (e.g., blinking LED, LED color change) or audio message (e.g. beeping sound, voice recording).

Responsive to the communication, the technician stops the PCB 150 insertion into the tube 100. The next stage involves the module 166 determining a rotational profile of the float magnet(s). In this stage, the technician will rotate the PCB 150 about the axis 504 (the z-axis) of the tube. The technician activates the electronics module for the sensor output acquisition in both z-axis and x-axis at high frequency (relative to rotation to provide desired granularity, e.g., 1-30 Hz and preferably 5-10 Hz) by pressing the appropriate input button on the module (if not automatically done by the module). The technician then rotates the sensor PCB 150 is around the z-axis 504 of the tube 100 through the full 360 degrees (while maintaining axial position) to capture the float magnetic field distribution as a function of the rotation angle. The module 166 may record z- and x-output vs. time. The technician may preferably go slightly beyond 360 degrees.

After completing the rotation, the technician may then command the electronics module to stop data acquisition (e.g., by pressing the appropriate input button on the module if the module is not configured to automatically go to the next stage).

In the next stage, the electronics module 166 processes the acquired data to determine the float magnet configuration. The module may be programmed to clean the data to compensate for over or under rotation from the ideal 360 degrees and for uneven rotational speed. This involves programming to identify the cycle in sensor output knowing that there will only be a small deviation from 360 degrees and knowing that other than single-magnet situations, there will be some cyclical symmetry. More basically, the module 166 may count maxima and minima for the two 3D sensors 154 and also determine correlation between them.

The module 166 may be preprogrammed with maps corresponding to rotational sensor output profiles (or simply maxima and/or minima counts and correlations) for known magnet distributions. The module may then compare the data (e.g., the number and the relative magnitude of the extracted maxima and minima for the acquired data in both the z-axis and the x-axis measurements) with look-up tables stored in memory. Thus, for example, when the float has a ring magnet, the z-axis and x-axis measurements show no maxima nor minima—the sensor output values remain constant during the sensor PCB rotation (solid lines in FIG. 10 and FIG. 11). For two diametrically opposite magnets with the magnet polarity parallel to the length of the PCB, rotation of the float about the z-axis produces a constant sensor output (dots in FIG. 10), while the x-axis sensor output (dots in FIG. 11) exhibits one minimum at start of the rotation (0 degrees) and one maximum midway through the rotation (180 degrees). In contrast, a float containing a single off-center magnet with the magnet polarity parallel to the length of the PCB 150, offers minima and maxima in both z-axis and x-axis sensor outputs (circles in FIG. 10 and FIG. 11, respectively).

In general, constant z-axis sensor output signifies a symmetric placement of the float magnets and use of 1D sensors will yield in that case accurate determination of the float position between the successive sensors. In turn, changing z-axis sensor output during the sensor PCB rotation signifies asymmetric float magnet configuration, where the use of 1D sensors will not facilitate accurate float position determination. Thus, upon characterizing the float, the electronics module notifies the technician by light output (e.g., blinking LED, LED color change) or audio message (e.g. beeping sound, voice recording) whether the float magnet configuration is symmetric (for example green LED signal) or asymmetric (for example red LED signal). In the former case, the float magnet configuration is suitable for the sensor PCB containing the 1D sensors and the technician may proceed to sensor calibration. In the latter case, the technician, upon viewing the displayed indication of an asymmetric float may then substitute an all-3D sensor (more expensive) board and afterwards proceed to the sensor calibration stage.

In addition to determining the float magnet configuration, it is desirable to properly calibrate the level measurement. This is why the second 3D sensor is provided at a predetermined spacing $S_2$ from the first sensor. The exemplary level calibration is carried out only after the float magnet configuration has been determined as described above. The exemplary level calibration comprises the following sub-steps/acts. The module, has already determined whether an all-3D sensor PCB is needed to address magnet asymmetry. In the case of a symmetric float magnet configuration, the PCB 150 with mixed 3D and 1D sensors may continue to be used. If asymmetric and the float characterization was performed using a PCB 150 with 1D sensors 152, the technician extracts it from the tube, disconnects it from the module and connects the all-3D PCB in its place. An example of an all-3D PCB (not shown) has a single array of 3D sensors 154 at a single on-center spacing.

Then, the technician activates the electronics module 166 to read the 3D sensor outputs (sensors 154 in PCB 150 or the lowest two sensors in the all-3D PCB) with high frequency (e.g., 1-30 Hz and preferably 5-10 Hz) by pressing the appropriate input button on the module (or this mode may be automatic). The technician then inserts the PCB into the tube 100 until the upper (of the two or of the lowest two) 3D sensor 154 detects the maximum magnetic field of the float.

In FIG. 9, this corresponds to the point $S_2$ relative insertion depth, whereby the upper 3D sensor output designated by the broken line in the plot reads the maximum. Thus, during the calibration, both the lower and the upper 3D sensor output signals are acquired simultaneously in the entire range of the float positions between them (i.e., from 0 to $S_2$ insertion depth in the FIG. 9 plot).

Figure 12:
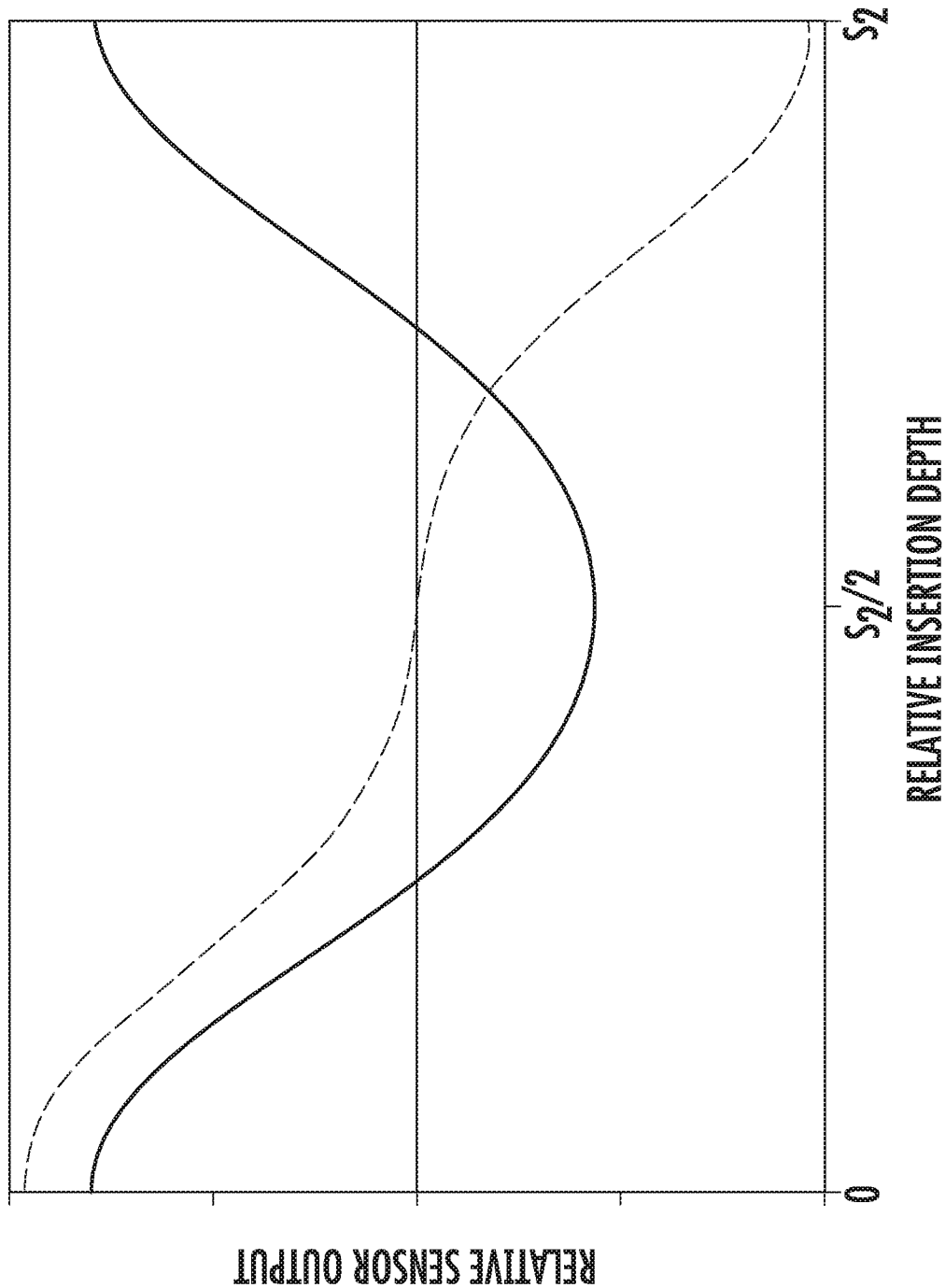
FIG. 12 is a plot of float magnet distance between sensors vs. normalized sum of sensor output for the calibration sensors in the replacement liquid level measurement assembly.
Figure 13:
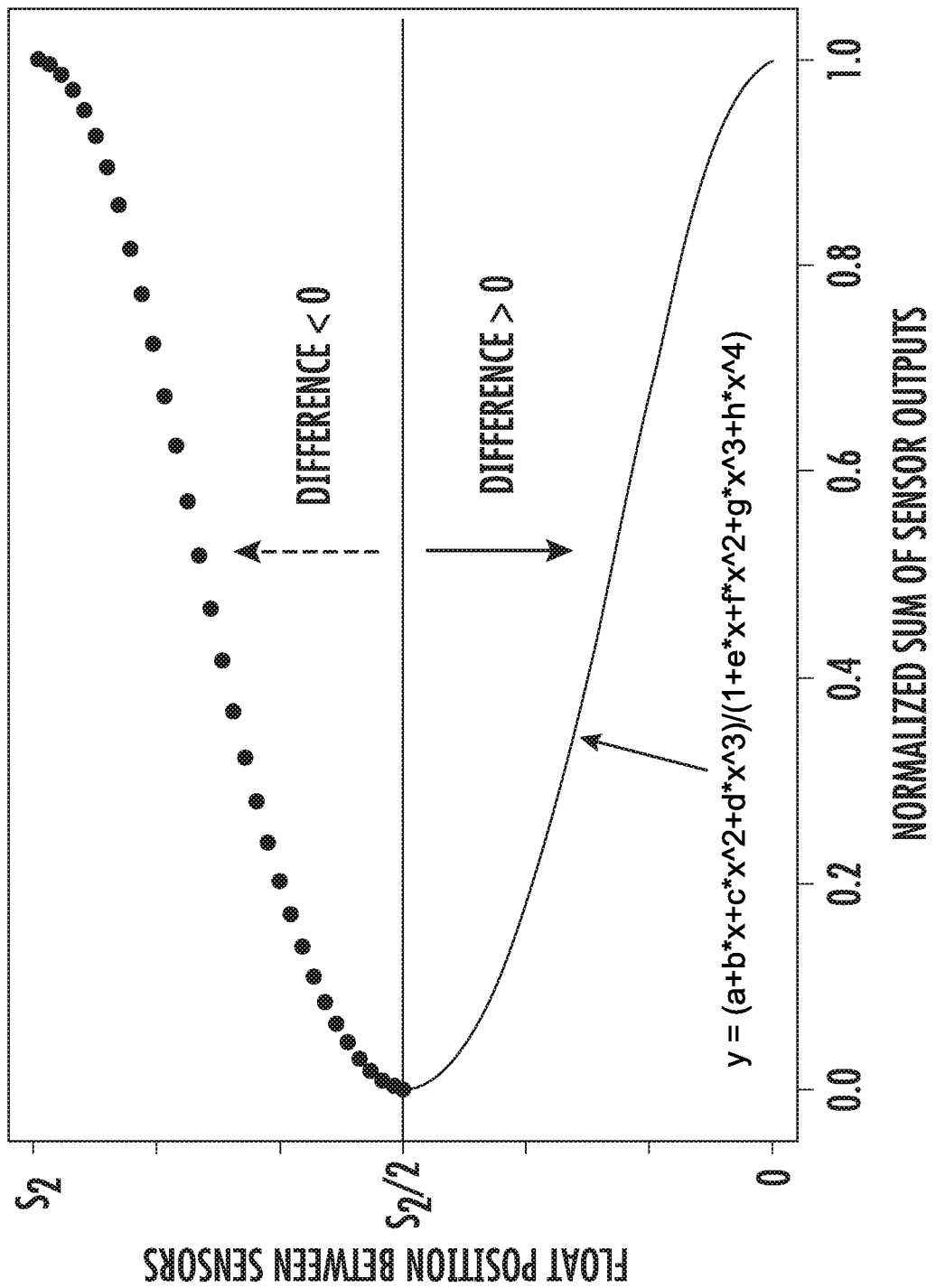
FIG. 13 is a plot of a rational polynomial function for a float containing two diametrically opposite magnets with the magnet polarity parallel to the length of the sensor PCB.

Upon the electronics module 166 determining that the maximum has been reached, the module calculates the difference of the two z-axis signals: (lower sensor−upper sensor outputs) and the sum of these two signals (lower sensor+upper sensor outputs). This is shown in FIG. 12 for the example of the float containing two diametrically opposite magnets with the magnet polarity parallel to the length of the sensor PCB. The signal difference gives a single valued function allowing determination of the float location between the two sensors (dashed line in FIG. 12). Specifically, positive function value indicates that the float is positioned 0 to $S_2/2$ from the upper sensor. Analogously, negative function value indicates the float position $S_2/2$ to $S_2$ from the upper sensor towards the lower one. The sum of the two sensor output signals is used to determine more precisely the float position between the two sensors (solid line in FIG. 12). The electronics module performs normalization of the sum signal by the acquired maximum and minimum z-axis sensor responses (normalized sum=sum/(maximum+minimum)). The specific float location between the two sensors is determined by using a look-up table listing the float location as the function of the normalized sum signal. Alternatively, the float location is determined by evaluating the inverse function: location=$(a+b*x+c*x^2+d*x^3)/(1+e*x+f*x^2+g*x^3+h*x^4)$, where x is the normalized sum signal and the parameters, a through h are accessed from the electronic's module memory for the particular float magnet configuration. FIG. 13 illustrates such a rational polynomial function plotted for the case of the float containing two diametrically opposite magnets with the magnet polarity parallel to the length of the sensor PCB. The module 166 may then store the resulting function to use in operation to determine the relative position of the float magnets between any two of the sensors 152 (for the mixed PCB) or 154 for the all-3D PCB.

Further, in the case of asymmetric float magnet configuration (when an all-3D sensor PCB is used), the float position between two successive sensors is determined from z-axis and x-axis measurements. Specifically, the electronics module multiplies the z-axis sensor outputs by a scaling factor prior to evaluation of the float location via the look-up table or the inverse function. This scaling factor is dependent on the float rotation relative to the sensor PCB corresponding and correlates to the x-axis sensor measurement. Thus, the scaling factor is itself a function of the x-axis sensor measurement and is stored in the processor memory for each unique float configuration. Considering an example of a float containing a single magnet with polarization parallel to the sensor PCB, FIG. 10 (open circles in the plot) points to the maximum z-axis sensor output at rotation angle of 180 degrees. At that rotation, the scaling factor is equal to 1.0. At rotation of 0 degrees, the z-axis sensor measurement is no longer at maximum and the scaling factor >1.0 would be used to "compensate" the signal for rotation.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A fire suppressant storage device (20) comprising:
a tank (22) having a first port (40), a second port (70), and an interior (32) for storing fire suppressant;
a discharge assembly (46) mounted to the first port and comprising:
a discharge valve (48); and
a discharge conduit (50) at least partially within the tank interior and having:
an interior; and
an exterior; and
a liquid level measurement assembly mounted to the second port and comprising:
a tube (100) at least partially within the tank interior and having:
an interior sealed relative to the tank interior; and
an exterior;
a float (120) surrounding the tube and having one or more magnets (130) and having a range of motion; and
a plurality of magnetic field sensors (152, 154) along a carrier (150) within the tube interior, the carrier extending from a proximal end to a distal end,
wherein the plurality of magnetic field sensors (152, 154) comprise:
a first plurality of one-dimensional sensors (152); and
at least two three-dimensional sensors (154) distally of the first plurality of one-dimensional sensors.

2. The fire suppressant storage device of claim 1 wherein:
said first plurality of one-dimensional sensors are analog interface sensors; and
said at least two three-dimensional sensors are digital interface sensors.

3. The fire suppressant storage device of claim 1 wherein:
said at least two three-dimensional sensors are lowermost sensors of the plurality of magnetic field sensors.

4. The fire suppressant storage device of claim 3 wherein:
said at least two three-dimensional sensors are only two three-dimensional sensors.

5. The fire suppressant storage device of claim 3 wherein:
the first plurality of one-dimensional sensors are an array of sensors at a single on-center spacing of 40.0 to 50.0 mm over a total span of at least 25% of a height of the tank interior.

6. The fire suppressant storage device of claim 1 wherein:
said first plurality of one-dimensional sensors are at a first longitudinal spacing ($S_1$); and
said at least two three-dimensional sensors are at a second longitudinal spacing ($S_2$) shorter than the first longitudinal spacing.

7. The fire suppressant storage device of claim 1 wherein:
said at least two three-dimensional sensors are only two three-dimensional sensors.

8. The fire suppressant storage device of claim 1 further comprising:

said fire suppressant within the tank interior, the discharge conduit at least partially immersed in the fire suppressant.

9. The fire suppressant storage device of claim 8 wherein:
said fire suppressant comprises a clean agent.

10. The fire suppressant storage device of claim 8 further comprising:
a compressed gas propellant in a headspace of the tank.

11. The fire suppressant storage device of claim 1 further comprising an electronics module (166) coupled to the plurality of magnetic field sensors and programmed for:
characterizing a float magnet configuration.

12. A method for remanufacturing a fire suppressant storage device (20) from a first configuration to a second configuration, the fire suppressant storage device having in the first configuration:
a tank (22) having a first port (40), a second port (70), and an interior (32) for storing fire suppressant;
a discharge assembly (46) mounted to the first port and comprising:
a discharge valve (48); and
a discharge conduit (50) at least partially within the tank interior and having:
an interior; and
an exterior; and
a liquid level measurement assembly mounted to the second port and comprising:
a tube (100) at least partially within the interior and having:
an interior sealed relative to the tank interior; and
an exterior;
a float (120) surrounding the tube; and
a magnetic member (122) axially moveable within the tube interior, the method comprising:
removing the magnetic member;
inserting into the tube a carrier (150) bearing a plurality of magnetic field sensors (152, 154), the carrier extending from a proximal end (156) to a distal end (158) and electronically coupling the plurality of magnetic field sensors to an electronics module (166), during the inserting one or more of the magnetic field sensors passing through the float,
wherein:
the plurality of magnetic field sensors (152, 154) comprise:
a first plurality of one-dimensional sensors (152); and
at least two three-dimensional sensors (154) distally of the first plurality of one-dimensional sensors; and
using said passing to calibrate sensor response.

13. The method of claim 12 wherein the magnetic member is a permanent magnet or a ferromagnetic steel and the removing comprises removing a measuring tape with the magnetic member.

14. The method of claim 12 wherein the carrier comprises a printed circuit board.

15. The method of claim 12 wherein:
the tank has a fitting;
the carrier comprises a cap or a plug; and
the inserting comprises mating the cap or plug to the fitting.

16. The method of claim 12 wherein the method is performed while leaving suppressant in the tank.

17. The method of claim 12 wherein the using said passing to calibrate the sensor response comprises:
using the magnetic field sensors to characterize the float; and
based on the characterization of the float, selecting a predefined sensing algorithm from a stored plurality of predefined sensing algorithms.

18. The method of claim 17 wherein:
the using the magnetic field sensors to characterize the float comprises using the at least two three-dimensional sensors; and
the predefined sensing algorithm is an algorithm for use of the first plurality of one-dimensional sensors.

19. The method of claim 18 wherein:
the at least two three-dimensional sensors are exactly two.

20. The method of claim 18 wherein:
said at least two three-dimensional sensors are lowermost sensors of the plurality of magnetic field sensors.

* * * * *